(12) United States Patent
Kim et al.

(10) Patent No.: US 12,373,671 B2
(45) Date of Patent: **\*Jul. 29, 2025**

(54) METHOD AND APPARATUS FOR GENERATING Q AND A MODEL BY USING ADVERSARIAL LEARNING

(71) Applicant: 42Maru Inc., Seoul (KR)

(72) Inventors: Dong Hwan Kim, Seoul (KR); Woo Tae Jeong, Seongnam-si (KR); Seanie Lee, Seongnam-si (KR); Gilje Seong, Seoul (KR)

(73) Assignee: 42Maru Inc., Seoul (KR)

( * ) Notice: Subject to any disclaimer, the term of this patent is extended or adjusted under 35 U.S.C. 154(b) by 165 days.

This patent is subject to a terminal disclaimer.

(21) Appl. No.: 18/214,301

(22) Filed: Jun. 26, 2023

(65) Prior Publication Data

US 2023/0342620 A1  Oct. 26, 2023

Related U.S. Application Data

(63) Continuation of application No. 16/699,443, filed on Nov. 29, 2019, now Pat. No. 11,710,046.

(51) Int. Cl.
*G06N 3/04* (2023.01)
*G06F 16/3329* (2025.01)
(Continued)

(52) U.S. Cl.
CPC ....... *G06N 3/0455* (2023.01); *G06F 16/3329* (2019.01); *G06F 16/3334* (2019.01);
(Continued)

(58) Field of Classification Search
CPC ...... G06N 3/0455; G06N 3/094; G06N 3/088; G06N 3/08; G06N 3/045; G06N 20/00;
(Continued)

(56) References Cited

U.S. PATENT DOCUMENTS

| 10,152,970 B1 | 12/2018 | Olabiyi et al. |
| 11,710,046 B2 * | 7/2023 | Kim ...................... G06N 3/094 706/11 |

(Continued)

FOREIGN PATENT DOCUMENTS

KR   10-2019-0076452   7/2019

OTHER PUBLICATIONS

Su et al., "Learning Visual Knowledge Memory Networks for Visual Question Answering" Jun. 13, 2018, arXiv: 1806.04860v1, pp. 1-10. (Year: 2018).*

(Continued)

*Primary Examiner* — Miranda M Huang
*Assistant Examiner* — Chase P. Hinckley
(74) *Attorney, Agent, or Firm* — Sughrue Mion, PLLC (57) ABSTRACT

A method of generating a question-answer learning model through adversarial learning may include: sampling a latent variable based on constraints in an input passage; generating an answer based on the latent variable; generating a question based on the answer; and machine-learning the question-answer learning model using a dataset of the generated question and answer, wherein the constraints are controlled so that the latent variable is present in a data manifold while increasing a loss of the question-answer learning model.

10 Claims, 8 Drawing Sheets

(51) Int. Cl.
G06F 16/3332 (2025.01)
G06F 16/334 (2025.01)
G06N 3/045 (2023.01)
G06N 3/0455 (2023.01)
G06N 3/08 (2023.01)
G06N 3/088 (2023.01)
G06N 3/094 (2023.01)
G06N 20/00 (2019.01)

(52) U.S. Cl.
CPC ......... *G06F 16/3347* (2019.01); *G06N 3/045* (2023.01); *G06N 3/08* (2013.01); *G06N 3/088* (2013.01); *G06N 3/094* (2023.01); *G06N 20/00* (2019.01)

(58) Field of Classification Search
CPC ............. G06F 16/3329; G06F 16/3334; G06F 16/3347
See application file for complete search history.

(56) References Cited

U.S. PATENT DOCUMENTS

| | | | | |
|---|---|---|---|---|
| 2018/0357240 | A1* | 12/2018 | Miller | G06N 5/022 |
| 2019/0130221 | A1 | 5/2019 | Bose et al. | |
| 2019/0220977 | A1 | 7/2019 | Zhou et al. | |
| 2019/0236139 | A1* | 8/2019 | DeFelice | G06N 3/044 |
| 2019/0392304 | A1 | 12/2019 | Aliper et al. | |
| 2020/0090049 | A1 | 3/2020 | Aliper et al. | |
| 2020/0097554 | A1 | 3/2020 | Rezagholizadeh et al. | |
| 2020/0104357 | A1 | 4/2020 | Bellegarda et al. | |
| 2020/0213354 | A1* | 7/2020 | Chakraborty | G06F 9/4416 |
| 2020/0226475 | A1 | 7/2020 | Ma et al. | |
| 2020/0242444 | A1* | 7/2020 | Zhang | G06N 3/042 |
| 2020/0285939 | A1 | 9/2020 | Baker | |
| 2020/0365166 | A1* | 11/2020 | Zhang | G10L 19/00 |
| 2020/0372369 | A1 | 11/2020 | Gong et al. | |
| 2021/0065066 | A1 | 3/2021 | Xue et al. | |
| 2021/0097372 | A1 | 4/2021 | Lee et al. | |
| 2021/0117842 | A1 | 4/2021 | Smith et al. | |
| 2021/0124999 | A1 | 4/2021 | Dia | |
| 2021/0142181 | A1* | 5/2021 | Liu | G06N 3/045 |
| 2021/0397797 | A1 | 12/2021 | Li et al. | |
| 2022/0165417 | A1 | 5/2022 | Chang et al. | |
| 2022/0383985 | A1* | 12/2022 | Theis | G16B 40/30 |

OTHER PUBLICATIONS

Gu et al., "DialogWAE: Multimodal Response Generation with conditional Wasserstein Auto-Encoder" Feb. 26, 2019, arXiv: 1805.12352v2, pp. 1-11. (Year: 2019).

Li et al., "Insufficient Data Can Also Rock! Learning to Converse using Smaller Data with Augmentation" Jul. 17, 2019, pp. 6698-6705. (Year: 2019).

Yao et al., Teaching Machines to Ask Questions Jul. 2018, pp. 1-7. (Year: 2018).

Huang et al., "FlowQA: Grasping Flow in History for Conversational Machine Comprehension" Apr. 16, 2019, arXiv: 1810.06683v3 pp. 1-15. (Year: 2019).

Shen et al., "Select and Attend: Towards Controllable Content Selection in Text Generation" Sep. 10, 2019, arXiv: 1909.04453v1, pp. 1-15. (Year: 2019).

Huang et al., "Contextual Fact Ranking and Its Applications in Table Synthesis and Compression" Aug. 2019, pp. 285-293. (Year: 2019).

Shao et al., "Transformer-based Neural Network for Answer Selection in Question Answering" Mar. 8, 2019, pp. 26146-26156. (Year: 2019).

Gao et al., "A Discrete CVAE for Response Generation on Short-Text Conversation" Nov. 22, 2019, arXiv: 1911,09845v1, pp. 1-11. (Year: 2019).

Grattarola et al., "Adversarial Autoencoders with Constant-Curvature Latent Manifolds" Apr. 11, 2019, arXiv: 1812.04314v2, pp. 1-25. (Year: 2019).

Kong et al., "An Adversarial Approach to High-Quality, Sentiment-Controlled Neural Dialogue Generation" Jan. 22, 2019, arXiv: 1901.07129v1. (Year: 2019).

Wang et Wan "T-CVAE: Transformer-Based Conditional Variational Autoencoder for Story Completion" Aug. 10, 2019, pp. 5523-5239. (Year: 2019).

Goodfellowetal., "Deep Learning" 2016, pp. i-777. (Year: 2016).

Abbas, et al. "WikiQA A question answering system on Wikipedia using freebase, DBpedia and Infobox," 2016 Sixth International Conference on Innovative Computing Technology (INTECH), 2016, pp. 185-193.

Gu, Xiaodong, et al. "Dialogwae: Multimodal response generation with conditional Wasserstein auto encoder." arXiv preprint arXiv: 1805.12352 (2019).

Office Action issued Sep. 26, 2022 for Korea App. No. 10-2020-0119571, 6 pages.

Rao, et al. "Answer-based adversarial training for generating clarification questions." arXiv preprint arXiv: 1904,02281 (2019).

Aken et al., "How Does BERT Answer Questions? A Layer-Wise Analysis of Transformer Representations" Sep. 11, 2019, arXiv: 1909.04925v1, pp. 1-10. (Year: 2019).

Bhattacharyya et al., "Conditional Flow Variational Autoencoders for Structured Sequence Prediction" Oct. 8, 2019, arXiv: 1908.09008v2, pp. 1-16. (Year: 2019).

Budzianowski et Vulic, "Hello, It's GPT-2—How Can I Help You? Towards the Use of Pretrained Language Models for Task-Oriented Dialogue Systems" Aug. 4, 2019, arXiv: 1907.05774v2, pp. 1-8. (Year: 2019).

Cho et al., "Mixture Content Selection for Diverse Sequence Generation" Sep. 4, 2019, arXiv: 1909.01953v1, pp. 1-11. (Year: 2019).

Deb et al., "Diversifying Reply Suggestions using a Matching-Conditional Variational Autoencoder" Mar. 25, 2019, arXiv: 1903.10630v1, pp. 1-8. (Year: 2019).

Lee etal., "Domain-agnostic Question-Answering with Adversarial Training" Oct. 22, 2019, arXiv: 1910.09342v2, pp. 1-7. (Year: 2019).

Le et al., "Variational Memory Encoder-Decoder" Oct. 20, 2018, arXiv: 1807.09950v2, pp. 1-17. (Year: 2018).

Pagnoni et al., "Conditional Variational Autoencoder for Neural Machine Translation" Dec. 11, 2018, arXiv: 1812,04405v1, pp. 1-9. (Year: 2018).

Ruan et al., "Condition-Transforming Variational Autoencoder for Conversation Response Generation" Apr. 24, 2019, arXiv: 1904.10610v1, pp. 1-5. (Year: 2019).

Shen et al., "On the Generation of Medical Question-Answer Pairs" Nov. 1, 2018, arXiv: 1811.00681v1, pp. 1-10. (Year: 2018).

Wang et Wang, "Riemannian Normalizing Flow on Variational Wasserstein Autoencoder for Text Modeling" Apr. 22, 2019, arXiv: 1904.02399v4, pp. 1-11. (Year: 2019).

Zhang et al., "Improve Diverse Text Generation by Self Labeling Conditional Variational Auto Encoder" Mar. 26, 2019, arXiv: 1903.10842v1, pp. 1-10. (Year: 2019).

Zhang etal., "DialoGPT: Large-Scale Generative Pre-training for Conversational Response Generation" Nov. 1, 2019, arXiv: 1911,00536v1, pp. 1-10. (Year: 2019).

Zhao et al., "Learning Discourse-level Diversity for Neural Dialog Models using Conditional Variational Autoencoders" Oct. 21, 2017 arXiv: 1703.10960v3, pp. 1-11. (Year: 2017).

\* cited by examiner

METHOD AND APPARATUS FOR GENERATING Q AND A MODEL BY USING ADVERSARIAL LEARNING

CROSS-REFERENCE TO RELATED APPLICATIONS

This application is a Continuation Application of U.S. application Ser. No. 16/699,443 filed Nov. 29, 2019, the disclosure of which is incorporated herein by reference in its entirety.

BACKGROUND OF THE INVENTION

The present invention discloses a method and apparatus of generating a question-answer learning model through adversarial learning. More specifically, the present invention discloses a method of simultaneously generating and learning a question-answer pair that may be generated in one passage and improving performance of a question-answer model by generating and learning various data sets for which a correct answer cannot be guessed by a current question-answer learning model.

Due to the recent development of technology, various question-answer systems using deep learning technology have been developed. Recently, a system that gives an answer appropriate for a question using a question-answer (QA) model when a user gives a question in a natural language to the system has been demonstrated. However, since such a deep learning-based QA model requires a large amount of learning data, it could not but automatically give only answers for some specific fields or topics. Furthermore, there was a problem that it takes a significant amount of time and cost to manually construct such learning data.

In addition, in a case of a recent question-answer learning model, performance is already significantly high because a preliminary training is performed using a language model objective or the like in a large amount of corpus. Therefore, even though more data are simply used for learning, performance of the question-answer model are not dramatically improved. Therefore, it is very important to secure new sample data in order to improve performance of machine learning.

SUMMARY OF THE INVENTION

An object of the present invention is to provide a method and an apparatus of generating a question-answer generating model that simultaneously generates a question-answer dataset capable of being generated based on an input passage even though an answer candidate group is not provided unlike an existing question-answer (QA) model in which a user manually collects and learns a joint distribution of question-answer pairs, and a question-answer learning model capable of being automatically learned using the question-answer generating model.

Particularly, a question-answer dataset generating model discloses a method of generating a question-answer dataset that cannot be guessed by a current question-answer learning model through adversarial learning.

According to an aspect of the present invention, a method of generating a question-answer learning model through adversarial learning may include: sampling a latent variable based on constraints in an input passage; generating an answer based on the latent variable; generating a question based on the answer; and machine-learning the question-answer learning model using a dataset of the generated question and answer, wherein the constraints are controlled so that the latent variable is present in a data manifold while increasing a loss of the question-answer learning model.

The sampling of the latent variable may include: generating a hidden representation for each word in the input passage and storing the hidden representation in a memory; and sampling the latent variable based on the hidden representation.

The generating of the answer may include: calculating importance of the hidden representation stored in the memory through an attention that uses the sampled latent variable as a query to generate a weighted sum vector; and generating an answer span based on the latent variable and the weighted sum vector.

The input passage may structure infobox data extracted from data crawled from a website.

In a case where the infobox data is not extracted from the crawled data, a paragraph standardized based on a data frequency in a table recognized through column recognition may be input as the passage.

The input passage may be data for which machine translation is completed, and the method may further include evaluating a quality of the machine translation by evaluating accuracy of an answer based on a dataset of the generated question and the answer.

According to another aspect of the present invention, an apparatus of generating a question-answer learning model through adversarial learning may include: one or more processors; and one or more memories in which instructions, when executed by the one or more processors, causing the one or more processors to perform an operation are stored, wherein the operation performed by the one or more processors includes: an operation of sampling a latent variable based on constraints in an input passage; an operation of generating an answer based on the latent variable; an operation of generating a question based on the answer; and an operation of machine-learning the question-answer learning model using a dataset of the generated question and answer.

The constraints may be controlled so that the latent variable is present in a data manifold while increasing a loss of the question-answer learning model.

The operation of sampling the latent variable may include: an operation of generating a hidden representation for each word in the input passage and storing the hidden representation in a memory; and an operation of sampling the latent variable based on the hidden representation.

The operation of generating the answer may include: an operation of calculating importance of the hidden representation stored in the memory through an attention that uses the sampled latent variable as a query to generate a weighted sum vector; and an operation of generating an answer span based on the latent variable and the weighted sum vector.

According to another exemplary embodiment, a program stored in a medium in order to execute generation of a question-answer dataset based on a passage input in combination with a computer which is hardware is provided.

Detailed contents of other exemplary embodiments of the present invention are described in a detailed description and are illustrated in the accompanying drawings.

DETAILED DESCRIPTION OF THE PREFERRED EMBODIMENTS

Various advantages and features of the present invention and methods accomplishing them will become apparent from the following description of exemplary embodiments with reference to the accompanying drawings. However, the present invention is not limited to exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims.

Terms used in the present disclosure are for describing exemplary embodiments rather than limiting the present invention. In the present disclosure, a singular form includes a plural form unless explicitly stated otherwise. Terms "comprise" and/or "comprising" used in the present disclosure do not exclude the existence or addition of one or more other components other than the mentioned components. Throughout the present disclosure, the same components will be denoted by the same reference numerals, and a term "and/or" includes each and all combinations of one or more of the mentioned components. Terms "first", "second" and the like are used to describe various components, but these components are not limited by these terms. These terms are used only in order to distinguish one component from another component. Therefore, a first component mentioned below may be a second component within the technical spirit of the present invention.

Unless defined otherwise, all terms (including technical and scientific terms) used in the present disclosure have the same meaning as meanings commonly understood by those skilled in the art to which the present invention pertains. In addition, terms defined in generally used dictionaries are not ideally or excessively interpreted unless they are specifically defined clearly.

Spatially relative terms "below", "beneath", "lower", "above", "upper", and the like, may be used in order to easily describe correlations between one component and other components. The spatially relative terms are to be understood as terms including different directions of the components at the time of use or at the time of operation in addition to directions illustrated in the drawings. For example, in a case of overturning component illustrated in the drawings, a component described as "below" or "beneath" another component may be placed "above" the other component. Therefore, an exemplary term "below" may encompass both of directions of above and below. Components may be oriented in other directions as well, and thus, spatially relative terms may be interpreted according to orientations.

Hereinafter, exemplary embodiments of the present invention will be described in detail with reference to the accompanying drawings.

Figure 1:
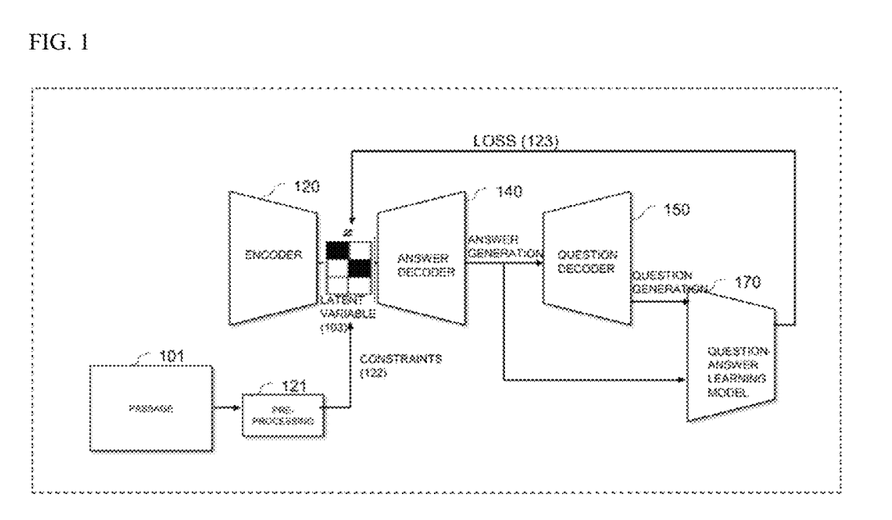
FIG. 1 is a conceptual diagram for schematically describing a question-answer learning model through adversarial learning according to an exemplary embodiment.

FIG. 1 is a conceptual diagram for schematically describing a question-answer learning model through adversarial learning according to an exemplary embodiment.

Referring to FIG. 1, a question-answer learning model using adversarial learning according to an exemplary embodiment may include an encoder 120, an answer decoder 140, a question decoder 150, and a question-answer learning model 170.

First, when a passage 101 is input, the question-answer learning model generates a latent variable 103 in the encoder 120 with reference to constraints 122 of a preprocessing step 121.

When the generated latent variable 103 is input to the answer decoder 140, the answer decoder 140 generates an answer based on the latent variable 103. Next, when the generated answer is input to the question decoder 150, the question decoder 150 generates a question paired with the answer.

In addition, the question-answer learning model 170 inputs a pair of the question and the answer each generated by the answer decoder 140 and the question decoder 150 to learn a question-answer learning model.

However, as question-answer pairs are automatically generated through the question-answer dataset generating model generated by the answer decoder 140 and the question decoder 150 according to an exemplary embodiment, it may already be guessed by the question-answer learning model, and therefore, they may not be very helpful. Therefore, a method for improving performance of machine-learning is required.

Therefore, a method of generating a question-answer dataset that cannot be guessed by a current question-answer learning model through adversarial learning is disclosed.

Figure 2:
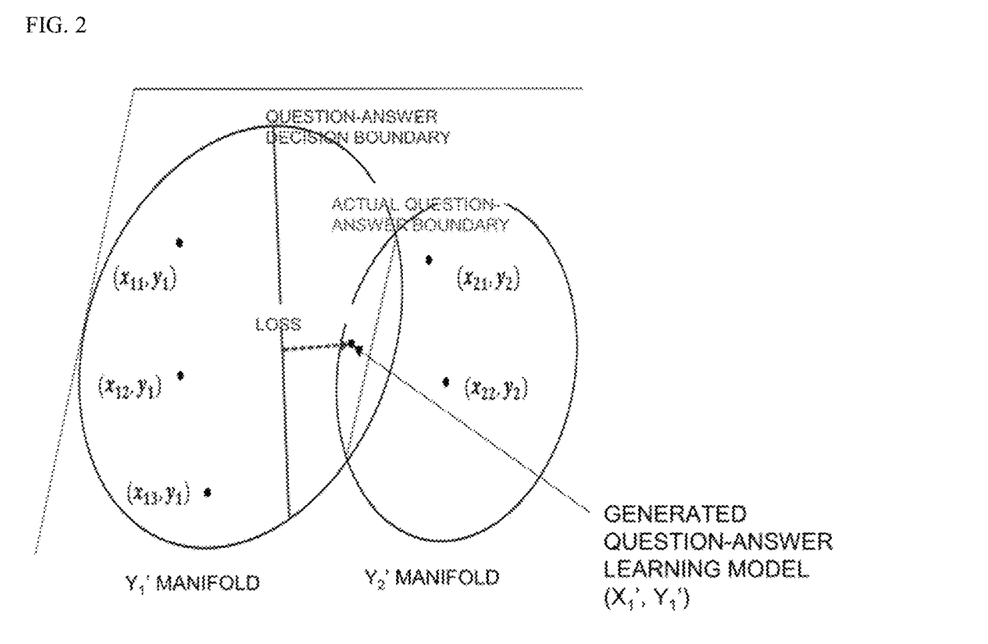
FIG. 2 is a view for describing a method of improving performance of a question-answer model through adversarial learning according to an exemplary embodiment.

More specifically, FIG. 2 is a view for describing a method of improving performance of a question-answer model through adversarial learning according to an exemplary embodiment.

Referring to FIG. 2, in order to perform adversarial learning, data present in a data manifold while being outside a decision boundary of the current question-answer model need to be sampled. Specifically, the method of generating a question-answer dataset based on a passage input according to an exemplary embodiment selects the latent variable through the encoder, and a question-answer data pair generated from the sampled latent variable needs to be a question-answer data pair whose correct answer cannot be guessed through a question-answer learning model. In this case, the question-answer learning model calibrates a decision boundary by learning the question-answer data pair whose correct answer could not be guessed, and when such a process is repeated, the decision boundary of the question-answer learning model may become close to a true decision boundary, and performs of the question-answer learning model may also be improved.

Meanwhile, a question-answer dataset for the adversarial learning may be determined by adjusting a loss of the question-answer learning model and constraints for positioning the question-answer data set in the data manifold.

Again referring to FIG. 1, the question-answer learning model in the adversarial manner described above may have an objective function of the following Equation 1:

$$\min_{\omega} \max_{\pi} \mathbb{E}_{x,y,c \sim p(x,y,c)}[\mathcal{L}_\omega(x, y, c)] +$$

$$\mathbb{E}_{c_u \sim p_u(c)}[\mathcal{L}_\omega(x_u, y_u, c_u) - D_{KL}[p_\pi(z|c_u) \| p_\psi(z|c_u)]]$$

$$\text{s.t.} \quad z \sim p_\pi(z|c_u), x_u, y_u \sim p_\theta(x, y|z, c_u)$$

[Equation 1]

Here x, y, c, and z correspond to a question, an answer, a paragraph, and a latent variable, respectively. When applying Equation 1 to FIG. 1, $q_\pi(z|c)$ is a function used for the preprocessing 121 of the question-answer learning model, $p_\pi(z|c)$ is a function used for the encoder 120, and $p_\theta(y|z, c)$, $p_\theta(x|z, y, c)$ and are functions used for the answer decoder 140 and the question decoder 150, respectively. In addition, conditional variational autoencoder (CVAE) may be used as the question-answer learning model 170.

The encoder 120 samples the latent variable (z), and a question and a correct answer generated from the sampling need to increase a loss ($\mathcal{L}_\omega$) of the question-answer model. However, since there may be no relationship between the question and the correct answer generated as such, constraints are required in selecting z. That is, as z becomes distant from the previously learned distribution of z, an invalid question-answer pair is generated. Therefore, in order to prevent this problem, a value may be adjusted in such a manner that a penalty is given when a distance between the two distributions becomes distant (for example, using a KL divergence).

Therefore, the question-answer learning model according to an exemplary embodiment may generate a latent variable which is valid and in which the question-answer learning model cannot guess a correct answer by adjusting the loss 123 and the constraints 122.

In addition, performance of the question-answer earning model may be improved by performing adversarial machine learning using a dataset of an adversarial question and answer generated using the generated latent variable.

Figure 3:
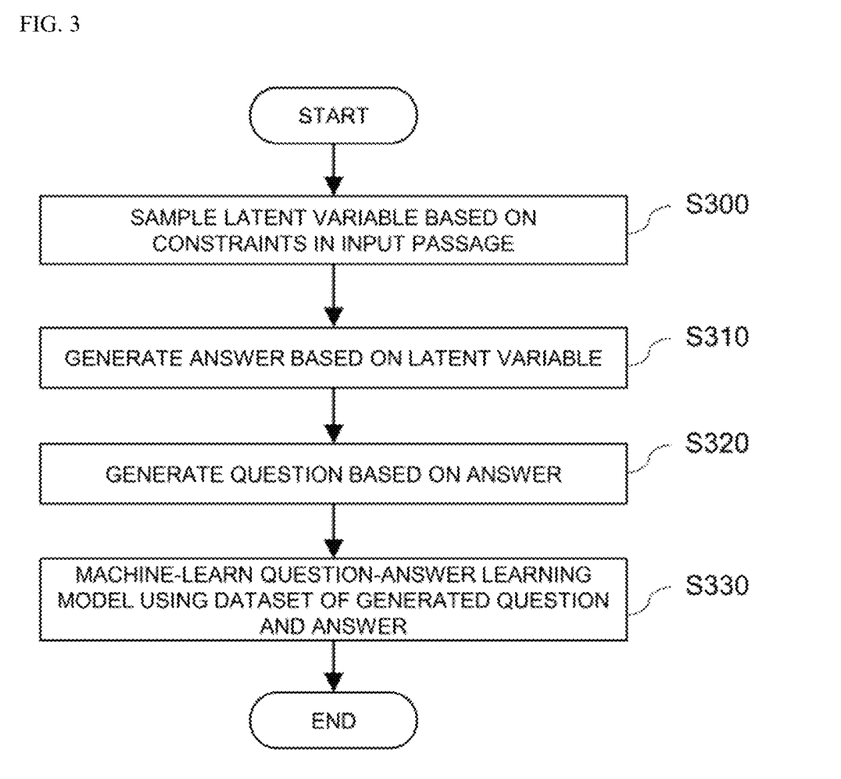
FIG. 3 is a flowchart for describing a method of generating a question-answer dataset based on a passage input according to an exemplary embodiment.

FIG. 3 is a flowchart for describing a method of generating a question-answer dataset based on a passage input according to an exemplary embodiment.

Referring to FIG. 3, a method of generating a question-answer learning model through adversarial learning samples a latent variable based on constraints in the input passage in step S300. Here, the constraints may be controlled so that the latent variable is present in a data manifold while increasing the loss of the question-answer learning model. For example, in order to perform adversarial learning on the generated question and the answer in the question-answer learning model, the loss ($\mathcal{L}_w$) needs to be increased. However, since there may be no relationship between the question and the correct answer generated as such, constraints are required in selecting the latent variable. That is, as the latent variable becomes distant from the previously learned distribution of the latent variable, an invalid question-answer pair is generated. Therefore, in order to prevent this problem, a value may be adjusted in such a manner that a penalty is given when a distance between the two distributions becomes distant.

Then, in step S310, an answer is generated based on the latent variable, and in step S320, a question is generated based on the answer. An operation of machine-learning the question-answer learning model is performed in step S330 using a dataset of the questions and answers generated by repeating step S310 and step S320.

Meanwhile, a method of generating a question-answer dataset according to an exemplary embodiment will hereinafter be described in more detail with reference to FIGS. 4 to 7.

Figure 4:
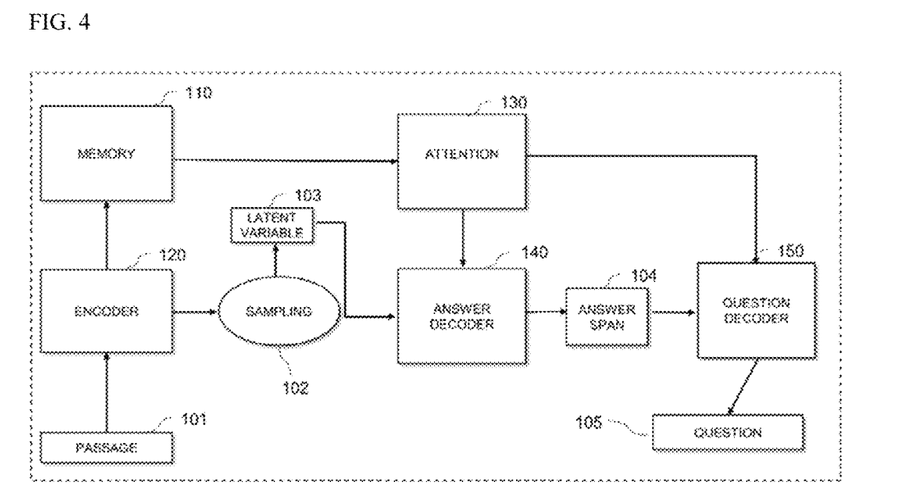
FIG. 4 is a conceptual diagram for schematically describing a question-answer dataset generating model based on a passage input.

FIG. 4 is a conceptual diagram for schematically describing a question-answer dataset generating model based on a passage input according to an exemplary embodiment.

Referring to FIG. 4, a question-answer dataset generating model according to an exemplary embodiment may include a memory 110, an encoder 120, an attention 130, an answer decoder 140, and a question decoder 150.

According to the method of generating a question-answer dataset according to an exemplary embodiment, a passage 101 including several sentences is input to the encoder 120 as it is. Here, the passage 101 may include a phrase, a part, a paragraph, and the like.

The encoder 120 generates a hidden representation for each word in the input paragraph 101 and stores the hidden representation in the memory 110. Here, the encoder 120 may construct the hidden representation from an input through a neural network. Therefore, the hidden representation may mean a machine-readable data representation learned in a hidden layer of the neural network, and may be composed of a pair of keys and values. For example, the encoder 120 may store information about a meaning represented by a component (for example, a word) of a sentence as the hidden representation.

Next, the encoder 120 performs sampling 102 based on the hidden representation to generate a latent variable 103, and the generated latent variable 103 is input to the answer decoder 140.

The answer decoder 140 calculates the importance of each component of the memory 110 through the attention 130 that uses the latent variable 103 as a query to generate a weighted sum vector of the memory 110. For example, each time the answer decoder 140 predicts an output word through the attention 130, the answer decoder 140 may refer to an entire input sentence in the encoder 120 once again. However, the answer decoder 140 does not refer to the entire input sentence in the same ratio, but may attentively refer to an input word portion associated with a word to be predicted at a corresponding time. Therefore, an attention function obtains similarities to 'Keys' obtained from all the hidden representations with respect to given 'Queries'. In addition, the obtained similarities are reflected in the respective 'values' mapped to the keys. In addition, a weighted sum vector may be obtained by adding all the values in which the similarities are reflected.

The answer decoder 140 predicts an answer span 104 based on the weighted sum vector. Here, the answer span may mean a start point and an end point where an answer is positioned in the input passage.

Next, the question decoder 150 may receive the previously generated answer span 104, and perform calculation of the attention 130 of the memory 110 to finally generate the question 105.

A question-answer dataset composed of a pair of the generated question and an answer according to an exemplary embodiment may be stored in the memory 110, and the stored question-answer dataset may be used to machine-learn a question-answer learning model.

Therefore, the dataset generating model according to an exemplary embodiment automatically generates a dataset of a question and an answer from the input passage, and may thus sample several question-answer pairs with only one passage input, thereby constructing more diverse data as compared with an existing manual input model.

More specifically, the method for generating a question-answer dataset described above may be implemented through an objective function shown in the following Equation 2:

$$\mathcal{L}_{\theta,\phi,\psi}(x, y, c) = \mathbb{E}_{x,y,c \sim p(x,y,c)} \big[ \mathbb{E}_{z \sim q_\phi(z|x,y,c)} \quad \text{[Equation 2]}$$
$$[-\log p_\theta(y|z, c) - \log p_\theta(x|z, y, c)]\big] + D_{KL}[q_\phi(z)\|p_\psi(z)]$$

Here x, y, c, and z correspond to a question, an answer, a paragraph, and a latent variable, respectively. $q_\phi(z|x, y, c)$ is a function used for the encoder of the question-answer model, and $p_\theta((y|z, c)$, $p_\theta(x|z, y, c)$ are functions used for the answer decoder and the question decoder, respectively. $p_\psi(z)$ is a marginal prior distribution of the latent variables, and $q_\phi(z)$ is a marginal posterior distribution of the latent variables. For example, $q_\phi(z)$ may generate a distribution of latent variables generated from the input, and $p_\psi(z)$ may generate an output close to the input using latent variables. Meanwhile, since it is very difficult to calculate a Kullback-Leibler (KL) divergence for optimization (for reducing a difference between the two distributions described above), it may be approximated as represented by the following Equation 3:

$$q_\phi(z) \approx \frac{1}{N} \sum_{n=1}^{N} q_\phi(z|x_n, y_n, c_n) \quad \text{[Equation 3]}$$
$$p_\psi(z) \approx \frac{1}{N} \sum_{n=1}^{N} p_\psi(z|c_n)$$

Meanwhile, how the passage input is performed and how a question-answer dataset construction model according to an exemplary embodiment may be utilized will be described with reference to FIGS. 5 to 7.

Figure 5:
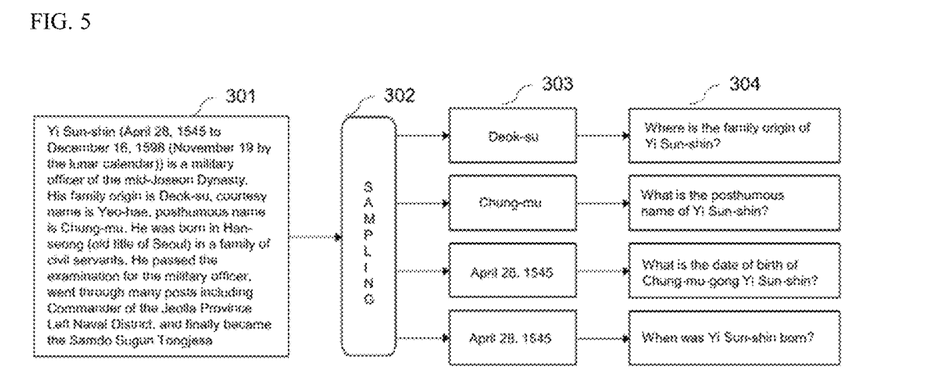
FIG. 5 is a view for describing an example of a method of generating a question-answer dataset in a paragraph according to an exemplary embodiment.

FIG. 5 is a view for describing an example of a method of generating a question-answer dataset in a paragraph according to an exemplary embodiment.

Referring to FIG. 3, when a paragraph 301 is input, an answer 303 is first generated through sampling 302. In addition, an answer 304 paired with the answer may be generated using the generated answer 303.

For example, in a case where there is a sentence "Yi Sun-shin (Apr. 28, 1545 to Dec. 16, 1598 (November 19 by the lunar calendar)) is a military officer of the mid-Joseon Dynasty" in an input passage, an answer "Apr. 28, 1545" may be first generated through sampling. In addition, various types of questions such as "When was Admiral Yi Sun-shin's birthday?" Or "When was Yi Sun Shin born?" may be generated based on the answer generated according to the method for generating a question-answer dataset according to an exemplary embodiment. Therefore, in a case of using the question-answer generating model, various datasets for machine-learning the question-answer model may be constructed.

Figure 6:
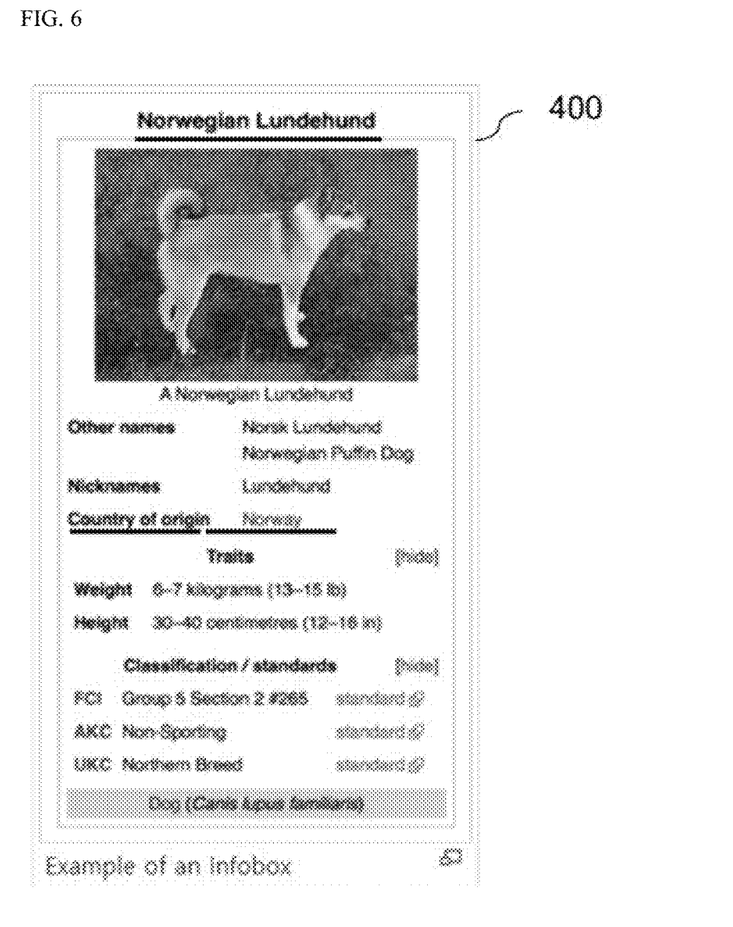
FIG. 6 is a view for describing a method of generating a question-answer dataset in a standardized infobox according to an exemplary embodiment.

FIG. 6 is a view for describing a method of generating a question-answer dataset in a standardized infobox according to an exemplary embodiment.

Referring to FIG. 6, the question-answer dataset generating model according to an exemplary embodiment may obtain infobox data 400 through crawling from a website famous as an online knowledge encyclopedia website.

Particularly, since the infobox data 400 is standardized, the infobox data 400 may be easily structured in a form of a corpus of questions and answers, and since these knowledge encyclopedia websites provide detailed classification data for fields or targets, an input passage may be generated in a preprocessing step so as to generate and machine-learn a question-answer by targeting a desired field.

However, since all websites do not provide the standardized infobox data 400 as illustrated in FIG. 6, crawled data is generally non-standardized. Therefore, in this case, how to create a passage to be input will be described.

Figure 7:
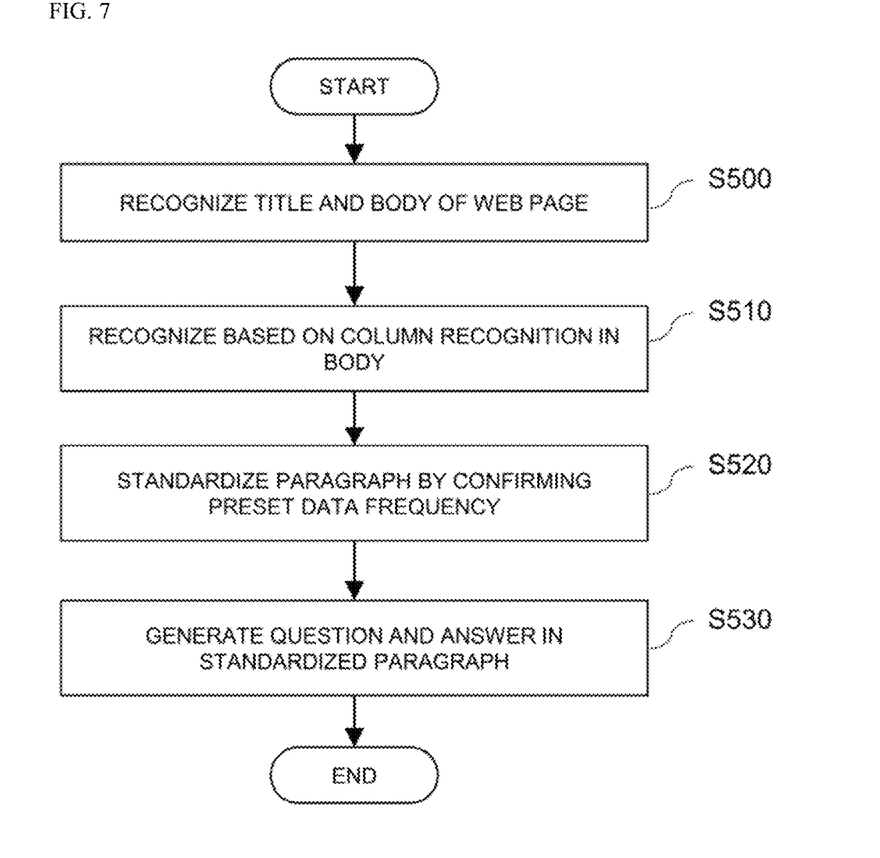
FIG. 7 is a view for describing a method of generating a question-answer dataset in a non-standardized page according to an exemplary embodiment.

FIG. 7 is a flowchart for describing a method of generating a question-answer dataset in a non-standardized page according to an exemplary embodiment.

Referring to FIG. 7, in step S500, the question-answer dataset construction model recognizes the title and the body of a web page from crawled data. In addition, in step S510, a table is recognized based on column recognition in the body. That is, the table is recognized in order to obtain data having a form similar to an infobox that may be obtained from the standardized site.

Then, in step S520, a paragraph is standardized by confirming whether or not there is a word satisfying a preset data frequency. For example, words that appear repeatedly, such as "country name" and "capital" may be confirmed, and the paragraph may be standardized based on these words.

In step S530, the question-answer dataset generating model may receive the standardized paragraph and generate a question-answer dataset to construct a dataset of various questions and answers in a dataset provided in an information box provided in a standardized form or a dataset provided in a table form on an existing website.

The question-answer dataset generating model described above according to another exemplary embodiment may extract a question-answer dataset from data for which learning and machine translation is completed, evaluate accuracy of an answer corresponding to the question, and utilize an evaluation result to verify a quality of learning or translation, beyond simply generating the question-answer dataset.

For example, if the question-answer dataset generating model according to an exemplary embodiment can generate a correct question-answer dataset from the data for which the machine translation is completed, it may be evaluated that machine reading is well performed.

Figure 8:
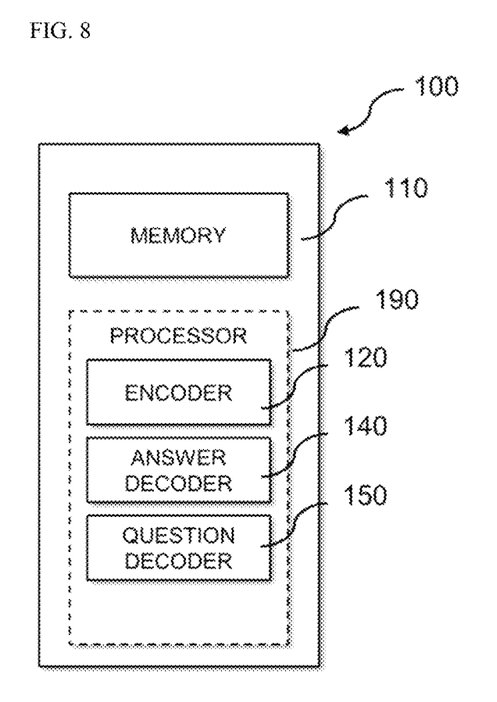
FIG. 8 is a block diagram schematically illustrating an internal configuration of an apparatus of generating a question-answer dataset according to an exemplary embodiment.

FIG. 8 is a block diagram schematically illustrating an internal configuration of an apparatus of generating a question-answer dataset according to an exemplary embodiment.

Referring to FIG. 8 an apparatus 100 of generating a question-answer dataset according to an exemplary embodiment may include one or more memories 110 and a processor 190. Operations of the apparatus 100 of generating a question-answer dataset may be performed by executing a program stored in the memory 110 through the processor 190.

The processor 190 according to an exemplary embodiment performs an operation of generating a hidden representation for each word in the input passage and storing the hidden representation in the memory 110.

In addition, the processor 190 samples a latent variable based on the hidden representation, and calculates the importance of the hidden representation stored in the memory through an attention that uses the sampled latent variable as a query to generate a weighted sum vector.

In addition, the processor 190 may perform an operation of generating an answer span based on the latent variable and the weighted sum vector and generating a question based on the generated answer span and the attention for the hidden representation in the memory.

In addition, the processor 190 may further perform an operation of storing a dataset of the generated question and an answer in the memory 110 and a machine learning operation of machine-learning a question-answer learning model using the stored dataset of the question and the answer.

In addition, the processor 19 may further perform an operation of generating a latent variable which is valid and in which the question-answer learning model cannot guess a correct answer by adjusting the loss of the question-answer learning model and the constraints and an operation of performing adversarial machine learning using the question-answer dataset generated using the generated latent variable.

Meanwhile, the apparatus 100 of generating a question-answer dataset described above may include one or more processors 190 and/or one or more memories 110. In addition, each of the processors 190 may include an encoder 120, an answer decoder 140, and a question decoder 150, and may perform the operations described above with reference to FIGS. 1 to 7 on each of the encoder 120, answer decoder 150, and question decoder 150.

In addition, the memory 110 may include a volatile and/or nonvolatile memory. The one or more memories 110 may store instructions that, when executed by the one or more processors 190, cause the one or more processors 190 to perform an operation. In the present disclosure, the program or the instruction, which is software stored in the memory 110, may include an operating system for controlling resources of a server, an application, and/or middleware that provides various functions to the application so that the application may utilize the resources of the apparatus.

The one or more processors 190 may drive software (for example, programs, instructions) to control at least one component of the apparatus 100 connected to the processors 190. In addition, the processor 190 may perform operations such as various operations, processing, data generation, and processing related to the present disclosure. In addition, the processor 190 may load data or the like from the memory 110 or store the data or the like in the memory 110.

In an exemplary embodiment, at least one of the components of the apparatus 100 may be omitted or another component may be added. Additionally or alternatively, some of the components may be implemented in an integrated form or be implemented as singular or plural entities.

Meanwhile, the steps of the method or the algorithm described in connection with an exemplary embodiment of the present invention may be implemented directly by hardware, by a software module executed by hardware, or by a combination of hardware and software. The software module may reside on a random access memory (RAM), a read only memory (ROM), an erasable programmable ROM (EPROM), an electrically erasable programmable ROM (EEPROM), a flash memory, a hard disk, a removable disk, a compact disk (CD)-ROM, or may reside on any type of computer extractable recording medium well-known in the art.

According to an exemplary embodiment, a dataset of a question and an answer for adversarial learning is automatically generated from an input passage, and several question-answer pairs may thus be sampled with only one passage input, thereby constructing more diverse data as compared with an existing model. In addition, performance of a question-answer learning model may be improved by machine-learning the data constructed as described above.

Effects of the present invention are not limited to the effects described above, and other effects that are not mentioned may be obviously understood by those skilled in the art from the following description.

Although the exemplary embodiments of the present invention have been described with reference to the accompanying drawings, those skilled in the art will understand that various modifications and alterations may be made without departing from the spirit or essential feature of the present invention. Therefore, it is to be understood that the exemplary embodiments described hereinabove are illustrative rather than being restrictive in all aspects.

What is claimed is:

1. A method of generating a question-answer dataset for adversarial learning of a question-answer learning model, comprising:
   accessing an input passage;
   generating a machine-readable data representation for each word in the input passage using the input passage and an encoder, the data representation comprising a pair of key and value;
   sampling a latent variable based on the data representation with reference to constraints using the data representation and the encoder;
   generating a weighted sum vector of the data representation using the latent variable, the pair of key and value and an answer decoder;
   generating an answer using the weighted sum vector and the answer decoder;
   generating a plurality of questions in different types associated to the answer using the answer and a question decoder;
   storing a plurality of question-answer datasets consisting of the answer and each of the plurality of questions in a memory; and
   correcting a decision boundary of a machine learning model by training the machine learning model with the plurality of question-answer datasets;
   wherein the constraints are associated with a distribution of the latent variable; and
   wherein the constraints are controlled so that the latent variable is present in a data manifold while increasing a loss of the machine learning model.

2. The method of claim 1, wherein the data representation comprises information about a meaning represented by a word, and
   wherein as the latent variable becomes distant from a distribution of a previously learned latent variable, a penalty is given to the latent variable.

3. The method of claim 1, wherein the generating of the weighted sum vector includes:
   obtaining a key from the pair of key and value comprised in the data representation;
   obtaining a similarity between the latent variable and the key;
   reflecting the similarity to a value of the pair of key and value comprised in the data representation; and
   generating the weighted sum vector based on the value to which the similarity is reflected.

4. The method of claim 1, wherein the input passage is generated by structuring infobox data extracted from data crawled from a website.

5. The method of claim 1, wherein the input passage is generated by recognizing a table based on column recognition from data crawled from a website and structuring data based on a data frequency in the table.

6. The method of claim 1, wherein the input passage is data for which machine translation is completed, and
wherein the method further comprises evaluating a quality of the machine translation by evaluating accuracy of an answer based on the plurality of question-answer datasets.

7. An apparatus of generating a question-answer dataset for adversarial learning of a question-answer learning model, comprising:
one or more processors; and
one or more memories in which instructions, when executed by the one or more processors, causing the one or more processors to perform an operation are stored,
wherein the operation performed by the one or more processors includes:
an operation of generating a machine-readable data representation for each word in an input passage using the input passage and an encoder, the data representation comprises a pair of key and value;
an operation of sampling a latent variable based on the data representation with reference to constraints using the data representation and the encoder;
an operation of generating a weighted sum vector of the data representation using the latent variable, the pair of key and value and an answer decoder;
an operation of generating an answer using the weighted sum vector and the answer decoder; and
an operation of generating a plurality of questions in different types associated to the answer using the answer and a question decoder;
an operation of correcting a decision boundary of a machine learning model by training the machine learning model with a plurality of question-answer datasets,
wherein the one or more memories are configured to store the plurality of question-answer datasets and provide the plurality of question-answer datasets as an input to the machine learning model,
wherein the constraints are controlled so that the latent variable is present in a data manifold while increasing a loss of the machine learning model.

8. The apparatus of claim 7, wherein the data representation comprises information about a meaning represented by a word, and
wherein as the latent variable become distant from distribution of a previously learned latent variable, a penalty is given to the latent variable.

9. The apparatus of claim 7, wherein the operation of generating the weighted sum vector includes:
an operation of obtaining a key from the pair of key and value comprised in the data representation;
an operation of obtaining a similarity between the latent variable and the key;
an operation of reflecting the similarity to a value of the pair of key and value comprised in the data representation; and
an operation of generating the weighted sum vector based on the value to which the similarity is reflected.

10. A non-transitory computer-readable recording medium having recorded thereon a computer program for executing a method of generating a question-answer dataset, the method comprising:
accessing an input passage;
generating a machine-readable data representation for each word in the input passage using the input passage and an encoder, the data representation comprises a pair of key and value;
sampling a latent variable based on the data representation with reference to constraints using the data representation and the encoder;
generating a weighted sum vector of the data representation using the latent variable, the pair of key and value and an answer decoder;
generating an answer using the weighted sum vector and the answer decoder;
generating a plurality of questions in different types associated to the answer using the answer and a question decoder;
storing a plurality of question-answer datasets consisting of the answer and each of the plurality of questions in a memory; and
correcting a decision boundary of a machine learning model by training the machine learning model with the plurality of question-answer datasets;
wherein the constraints are associated with a distribution of the latent variable; and
wherein the constraints are controlled so that the latent variable is present in a data manifold while increasing a loss of the machine learning model.

* * * * *